United States Patent
Hung

(10) Patent No.: US 9,930,349 B2
(45) Date of Patent: Mar. 27, 2018

(54) IMAGE PROCESSING TO RETAIN SMALL COLOR/GRAY DIFFERENCES

(71) Applicant: Konica Minolta Laboratory U.S.A., Inc., San Mateo, CA (US)

(72) Inventor: Po-Chieh Hung, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/105,969

(22) PCT Filed: Feb. 20, 2015

(86) PCT No.: PCT/US2015/016822
§ 371 (c)(1),
(2) Date: Jun. 17, 2016

(87) PCT Pub. No.: WO2015/127206
PCT Pub. Date: Aug. 27, 2015

(65) Prior Publication Data
US 2016/0323587 A1    Nov. 3, 2016

Related U.S. Application Data

(60) Provisional application No. 61/942,475, filed on Feb. 20, 2014.

(51) Int. Cl.
*H04N 19/186* (2014.01)
*G06T 9/00* (2006.01)
*H04N 1/64* (2006.01)

(52) U.S. Cl.
CPC ............ *H04N 19/186* (2014.11); *G06T 9/00* (2013.01); *H04N 1/642* (2013.01)

(58) Field of Classification Search
CPC ... G06T 2207/10052; G06T 9/00; G06T 9/20; G06T 15/20; G06T 2207/10012; G06T 2207/10024; G06T 7/593; G06T 7/85; G06T 11/00; G06T 2207/10016; G06T 7/11; G06T 7/168; G06T 7/215; G06T 7/262; G06T 7/37; G06T 7/90; G06T 5/007; H04N 13/0048; H04N 19/136; H04N 1/00482; H04N 1/40068; H04N 9/43; H04N 1/00244; H04N 1/00347; H04N 1/00795;
(Continued)

(56) References Cited
U.S. PATENT DOCUMENTS 5,182,639 A * 1/1993 Jutamulia ............... H04N 9/43
348/32
5,553,200 A * 9/1996 Accad ................... H04N 1/407
358/1.15
(Continued)

OTHER PUBLICATIONS

International Preliminary Report on Patentability and Translation of Written Opinion issued in corresponding International Application No. PCT/US2015/016822 dated Sep. 1, 2016 (6 pages).

*Primary Examiner* — Aklilu Woldemariam
(74) *Attorney, Agent, or Firm* — Osha Liang LLP

(57) ABSTRACT

A method for encoding a monochrome or color image. The method includes receiving an image and adjusting the image based on a global uniform macro-type color space. The image is modified spatially based on a local uniform micro-type edge characteristic that includes a just-noticeable difference (JND), and the image is outputted.

17 Claims, 7 Drawing Sheets

(58) Field of Classification Search
CPC .. H04N 1/00822; H04N 1/32771; H04N 1/40; H04N 2201/0027; H04N 2201/0039; H04N 2201/0065; H04N 2201/0081; H04N 2201/0093; H04N 1/00023; H04N 1/00068; H04N 1/32502; H04N 1/32529; H04N 1/60; H04N 1/52; H04N 1/40062; H04N 1/4053; H04N 1/407; H04N 1/41; H04N 13/0257; H04N 13/0037; H04N 1/32251; H04N 1/32309; H04N 1/6008; H04N 1/628; H04N 2201/0091; G03G 15/5087; G03G 2215/00021; G06F 3/1211; G06F 3/124; G06F 3/1282; G06K 15/1859; G09G 2340/0428; G09G 5/391; G09G 2340/06
USPC ............... 382/154, 232, 275, 284, 291, 237; 358/518, 519, 523, 534, 539
See application file for complete search history.

(56) References Cited

U.S. PATENT DOCUMENTS

| | | | | |
|---|---|---|---|---|
| 5,982,441 A * | 11/1999 | Hurd | ............ | H04N 19/96 348/417.1 |
| 6,185,336 B1 * | 2/2001 | Clark | ............ | H04N 1/40062 358/1.9 |
| 6,330,085 B1 * | 12/2001 | Yamamoto | ............ | H04N 1/622 358/448 |
| 7,272,265 B2 * | 9/2007 | Kouri | ............ | G06K 9/00516 382/260 |
| 7,551,796 B2 * | 6/2009 | Ohyama | ............ | H04N 1/00244 358/1.1 |
| 8,004,536 B2 * | 8/2011 | Wilensky | ............ | G06F 3/04842 345/589 |
| 8,897,596 B1 * | 11/2014 | Passmore | ............ | H04N 13/0267 358/3.26 |
| 9,240,049 B2 * | 1/2016 | Ciurea | ............ | G06T 7/593 |
| 2005/0243375 A1 * | 11/2005 | Ohyama | ............ | H04N 1/00244 358/2.1 |
| 2007/0080975 A1 * | 4/2007 | Yamashita | ............ | G09G 5/04 345/591 |
| 2008/0056588 A1 * | 3/2008 | Kojima | ............ | H04N 1/40062 382/232 |
| 2008/0165378 A1 * | 7/2008 | Barry | ............ | B41J 29/393 358/1.9 |
| 2008/0225342 A1 * | 9/2008 | Lin | ............ | H04N 1/32251 358/3.06 |
| 2010/0026722 A1 * | 2/2010 | Kondo | ............ | G09G 3/2007 345/660 |
| 2015/0286340 A1 * | 10/2015 | Send | ............ | G01S 17/46 345/175 |

* cited by examiner

IMAGE PROCESSING TO RETAIN SMALL COLOR/GRAY DIFFERENCES

BACKGROUND

In the medical field, color images are often used for whole slide images (WSI) in pathology. Further, monochrome images or grayscale are used within the medical field as well. The encoding of grayscale images within the medical field often utilizes the Grayscale Standard Display Function (GSDF) in accordance with the Digital Imaging and Communications in Medicine (DICOM) Standard which was developed according to the procedures of the DICOM Standards Committee. The GSDF function relates noticeable differences (JND) in luminance to a JND index. While the GSDF is not intended for medical color images, color images may be displayed on standardized grayscale displays.

However, non-medical images are often encoded according to uniform color space, for example the CIE L*a*b* color space designed to match the Munsell Color System, an empirically defined uniform color space. Thus, there could be advantages to a method and a device for encoding monochrome and color images according to a global uniform macro-type color space, while at the same time modifying the image spatially, based on a local uniform micro-type edge characteristic.

SUMMARY OF INVENTION

In general, in one aspect, the invention relates to a method for encoding a monochrome or color image. The method includes receiving the image and adjusting the image based on a global uniform macro-type color space. The method also includes modifying the image spatially based on a local uniform micro-type edge characteristic comprising a just-noticeable difference (JND), and outputting the image. The method may also include converting, before the modifying of the image, the image from a first global uniform macro-type color space into a second global uniform macro-type color space, and converting, after the modifying of the image, the image from the second global uniform macro-type color space into the first global uniform macro-type color space. In one or more embodiments, the local uniform micro-type edge characteristic is in the second global uniform macro-type color space.

In general, in another aspect, the invention relates to a non-transitory computer readable medium (CRM) storing instructions for encoding a monochrome or color image. The CRM instructions include receiving the image and adjusting the image based on a global uniform macro-type color space. The CRM instructions also include modifying the image spatially based on a local uniform micro-type edge characteristic comprising a just-noticeable difference (JND), and outputting the image. The CRM instructions may also include converting, before the modifying of the image, the image from a first global uniform macro-type color space into a second global uniform macro-type color space, and converting, after the modifying of the image, the image from the second global uniform macro-type color space into the first global uniform macro-type color space. In one or more embodiments, the local uniform micro-type edge characteristic is in the second global uniform macro-type color space.

In general, in another aspect, the invention relates to a device for encoding a monochrome or color image. The device includes a first memory that receives an image, and an image adjustment section that adjusts the image based on a global uniform macro-type color space. The device also includes an image modification section that modifies the image spatially based on a local uniform micro-type edge characteristic comprising a just-noticeable difference (JND), and a second memory that receives an output image. In one or more embodiments, the image adjustment section may, before the modifying of the image, convert the image from a first global uniform macro-type color space into a second global uniform macro-type color space and, after the modifying of the image, convert the modified image from the second global uniform macro-type color space into the first global uniform macro-type color space. In one or more embodiments, the local uniform micro-type edge characteristic is in the second global uniform macro-type color space.

Other aspects of the invention will be apparent from the following description and the appended claims.

BRIEF DESCRIPTION OF DRAWINGS

FIG. 7 shows that little or no edge enhancement is applied to a large edge, while a small edge is enhanced depending on the characteristics of JND color difference.

DETAILED DESCRIPTION

Figure 1:
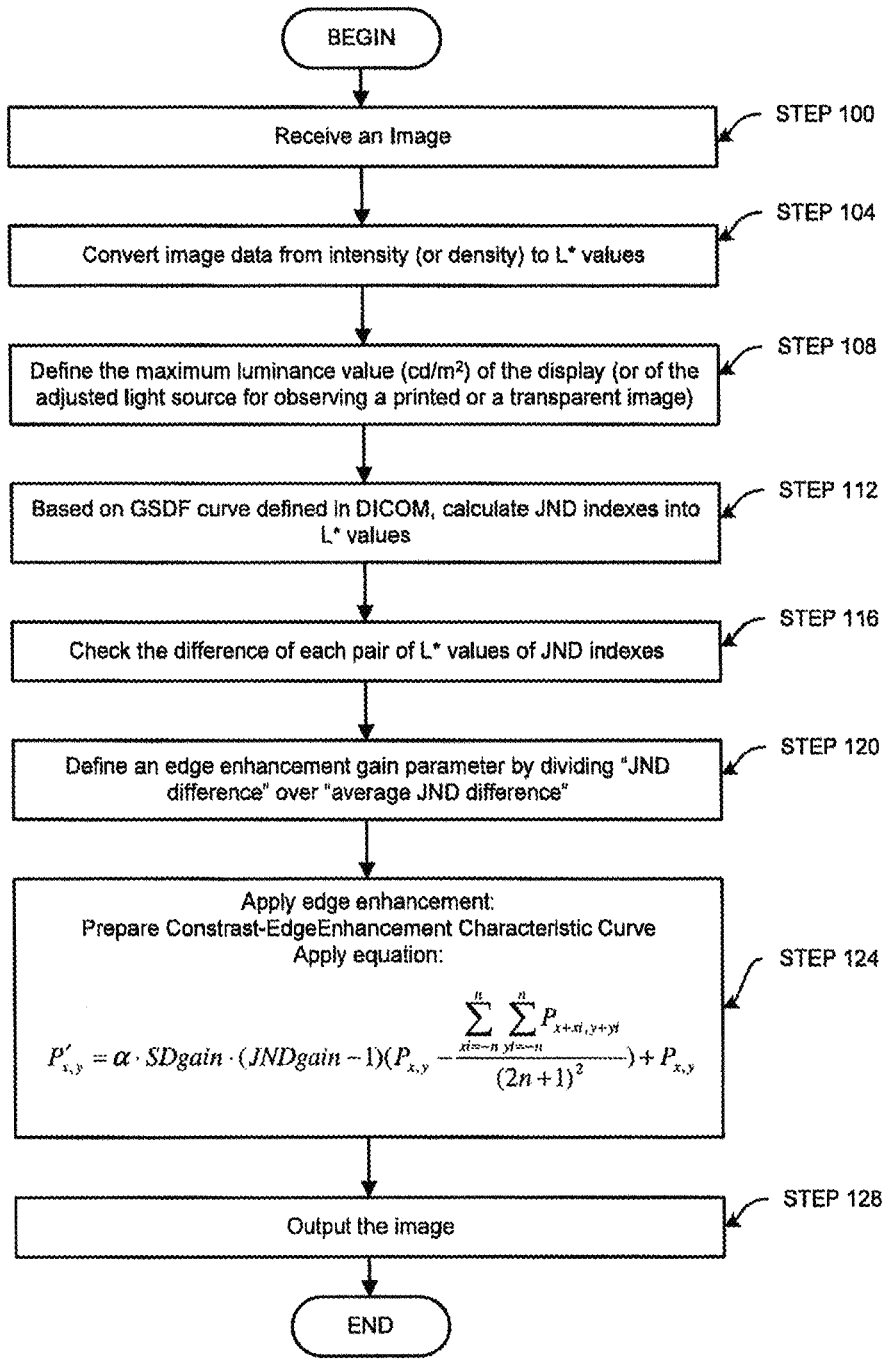
FIG. 1 shows a flowchart for encoding an image in accordance with one or more embodiments of the invention.

Specific embodiments of the invention will now be described in detail with reference to the accompanying figures. Like elements in the various figures are denoted by like reference numerals for consistency. Further, the use of "FIG." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and device for encoding an image. The method for encoding an image may include adjusting the image based on a global uniform macro-type color space and modifying the image spatially based on a local uniform micro-type edge characteristic. As used herein, the term uniform macro-type color space refers to a macro-type color space such as, e.g., sRGB, Adobe RGB, CIE L*a*b*, and CIE L*u*v*. One of ordinary skill would appreciate that other uniform color spaces may be used without departing from the scope of the present disclosure. Further, as used herein, the term local uniform micro-type edge characteristic refers to the local characteristic of image features, e.g., the presence of edges and the distribution of features within a local just-noticeable difference (JND) equalized tonal curve. One of ordinary skill would appreciate that other local uniform micro-type edge characteristics may be used without departing from the scope of the present disclosure.

In accordance with one or more embodiments, FIG. 1 shows a flow chart illustrating a method for encoding an image. Specifically, FIG. 1 illustrates the image encoding flow for a monochrome image. Monochrome refers here to a grayscale image, but could also refer to an image of a single color only. Further, the monochrome image may be received by several methods. For example, the monochrome image could be received after capture of shades of black by a sensor. Alternatively, the monochrome image could be received after post-processing of a color image. Other methods of receiving the monochrome image may be used without departing from the scope of the present disclosure.

Figure 2:
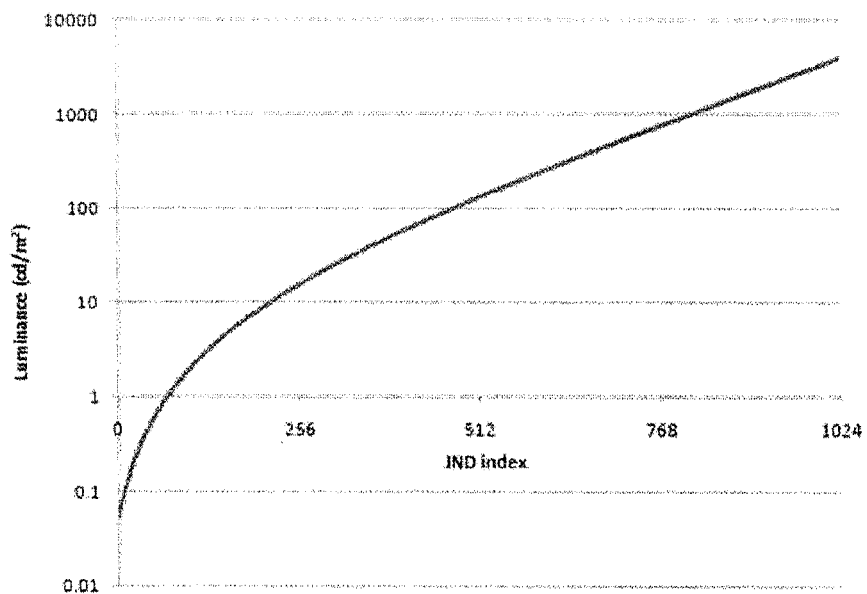
FIG. 2 illustrates a GSDF curve defined by the Digital Imaging and Communications in Medicine (DICOM) Standard in accordance with one or more embodiments of the invention.

In Step 100 of FIG. 1, a monochrome image is received. The image data of the received image is converted from intensity (or density) into lightness L* values in step 104. Next, the maximum luminance value (in cd/m²) of the display or of the adjusted light source for observing a printed or a transparent image is defined in step 108. As referred to above, a Just-Noticeable Difference (JND) is a luminance difference of a given target under given viewing conditions that the average human observer can perceive. Further, a JND index is the input value to the Grayscale Standard Display Function (GSDF), such that one step in the JND index results in a luminance difference that is a JND. Accordingly, in step 112, JND indexes are calculated into L* values, based on the GSDF curve defined by the Digital Imaging and Communications in Medicine (DICOM) Standard and as shown in FIG. 2.

Figure 3:
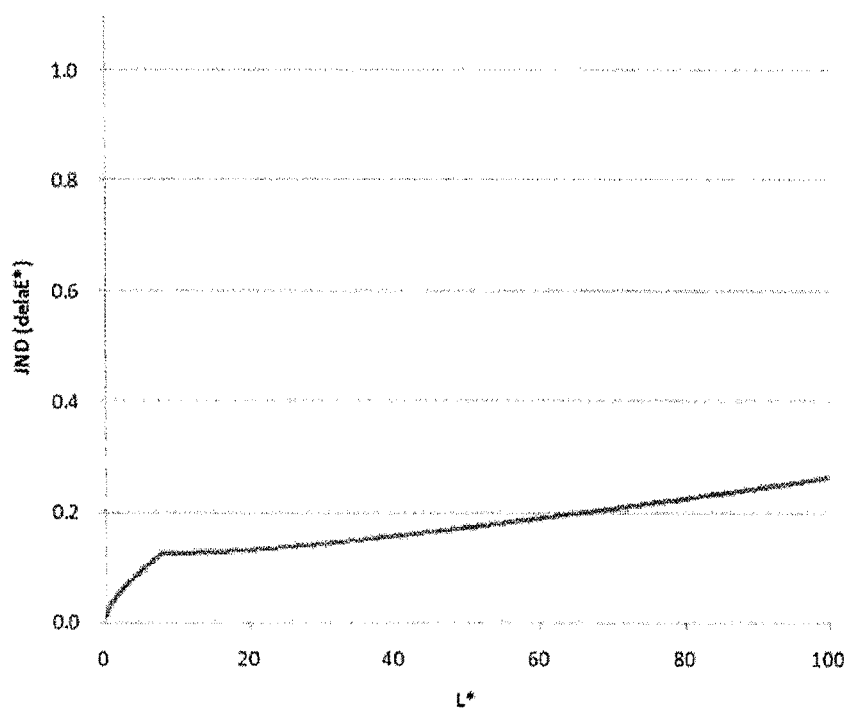
FIG. 3 illustrates a computation of the difference of each pair of L* values of JND indexes in accordance with one or more embodiments of the invention.
Figure 4:
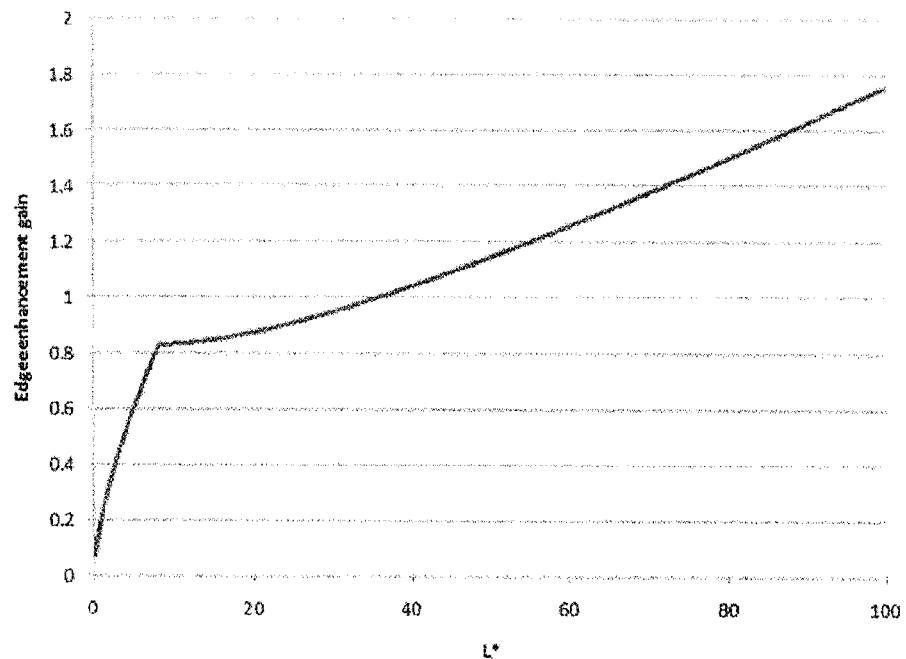
FIG. 4 shows an edge enhancement gain parameter in accordance with one or more embodiments of the invention.

In step 116 of FIG. 1, the difference of each pair of L* values of JND indexes is computed as is shown in FIG. 3. Next, in step 120 of FIG. 1, an edge enhancement gain parameter is defined by dividing "JND difference" over "average JND difference," wherein the JND index "673" corresponds to a luminance of 400 cd/m², which is the typical luminance of "white" on a display. In accordance with one or more embodiments, the edge enhancement gain parameter is shown in FIG. 4.

Figure 5:
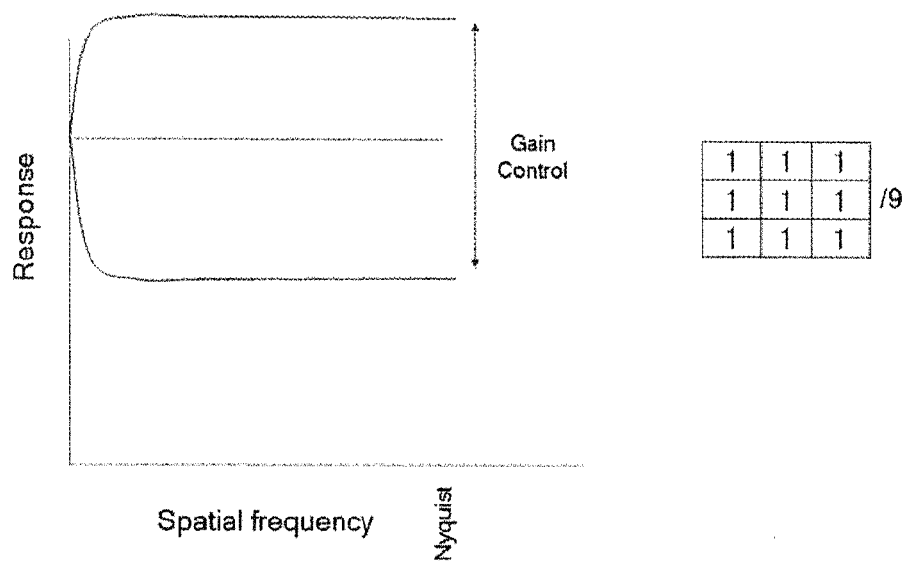
FIG. 5 illustrates an edge enhancement as a function of spatial frequency and the use of a kernel matrix in accordance with one or more embodiments of the invention.

In step 124 of FIG. 1, an edge enhancement is applied. As shown in FIG. 5, to primarily affect the higher spatial frequencies, a difference between a center pixel value and an average value of accumulated pixel values surrounding the center pixel in a kernel matrix is determined for the edge enhancement. The kernel matrix is, for example, a 3×3 pixel matrix or a 5×5 pixel matrix, and a bigger kernel is generally preferred in terms of spatial characteristics. However, other kernel matrices may also be used without departing from the scope of the present disclosure.

Figure 6:
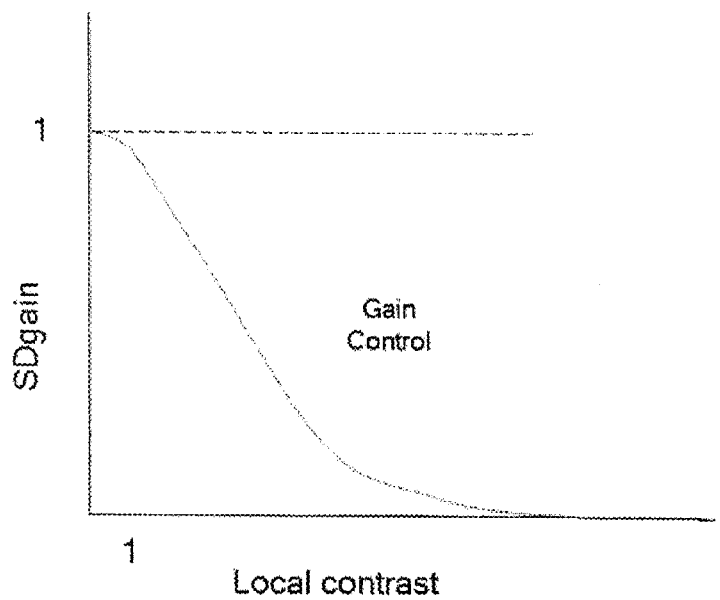
FIG. 6 shows a "Contrast-EdgeEnhancement" curve in which the local contrast is obtained from a kernel matrix in accordance with one or more embodiments of the invention.

In step 124 of FIG. 1, a "Contrast-EdgeEnhancement" characteristic curve is prepared. In accordance with one or more embodiments, FIG. 6 shows a "Contrast-EdgeEnhancement" curve in which the local contrast obtained from a kernel matrix is on the horizontal axis and a standard deviation gain (SDgain) is on the vertical axis. FIG. 6 illustrates how larges edges receive less or no edge enhancement. Further, in one or more embodiments, the local contrast is based on a kernel matrix in JND space. In other embodiments, the local contrast may be based on a uniform color space. In yet other embodiments, the local contrast may be based on another criteria without departing from the scope of the present invention.

In step 124 of FIG. 1, the equation (1) reproduced below is applied to the image. The local contrast may be calculated by standard deviation of a local area, for example the local kernel matrix shown in FIG. 5. In equation (1), SDgain refers to standard deviation gain and a denotes a coefficient.

$$P'_{x,y} = \alpha \cdot SDgain \cdot (JNDgain - 1)\left(P_{x,y} - \frac{\sum_{xi=-n}^{n}\sum_{yi=-n}^{n} P_{x+xi,y+yi}}{(2n+1)^2}\right) + P_{x,y} \quad (1)$$

Figure 7:
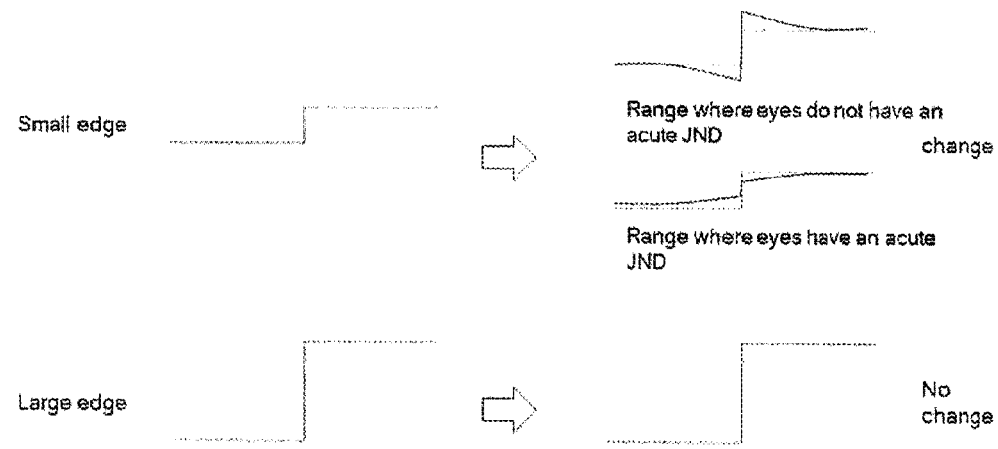
FIG. 7 illustrates an example of edge enhancement in accordance with one or more embodiments.

The effect of the above equation on the modified image is illustrated in FIG. 7. Little or no edge enhancement is applied to a large edge, while a small edge is enhanced depending on the characteristics of the JND color difference against the macro-type color space. In other words, an edge enhancement may be applied by a predefined amount when the edge is smaller, and an edge enhancement may be reduced by a predefined amount when the edge is large. In step 128, the image is outputted.

Figure 8:
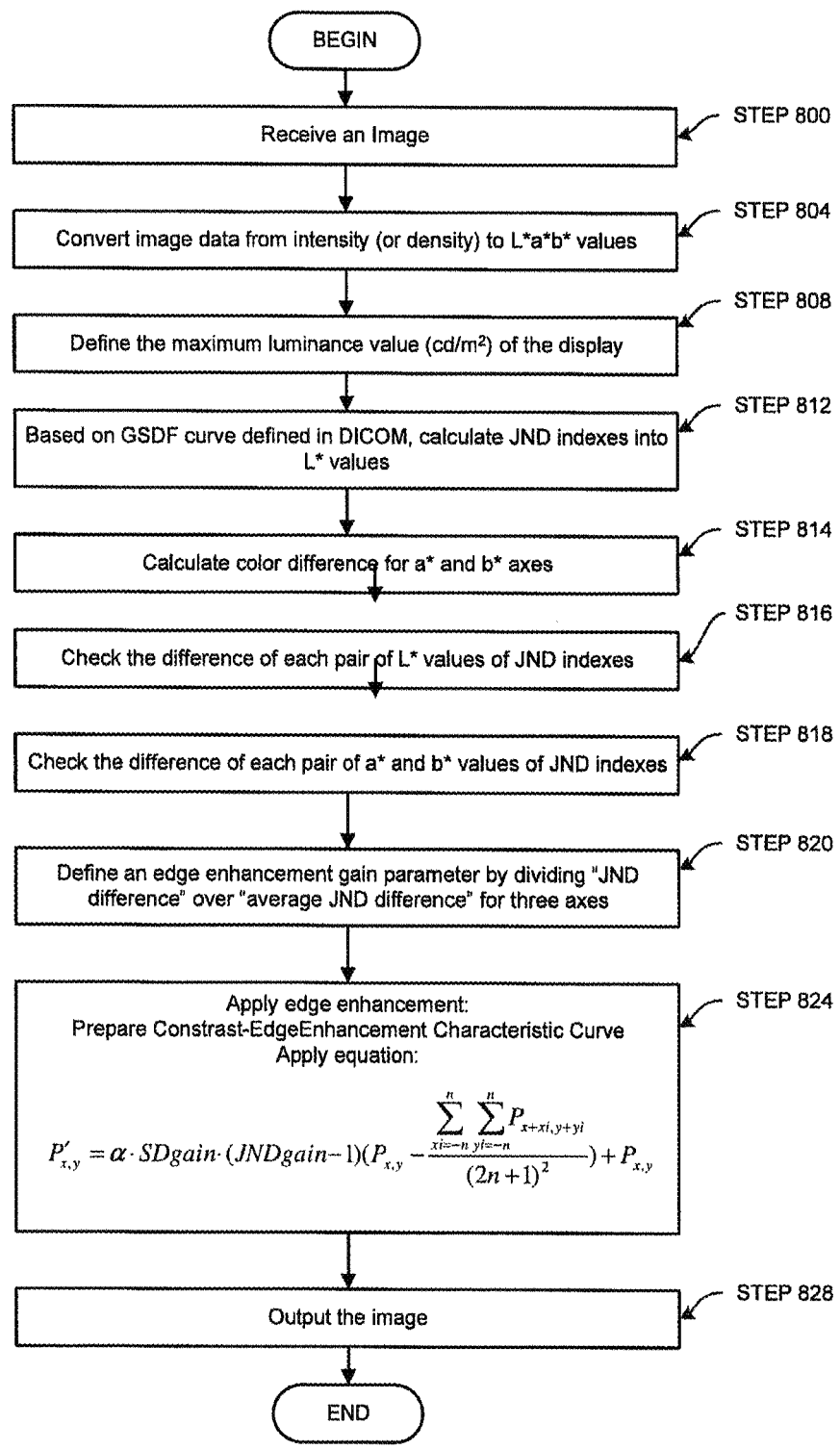
FIG. 8 illustrates a flowchart for encoding an image in accordance with one or more embodiments of the invention.

In accordance with one or more embodiments, FIG. 8 shows a flow chart illustrating a method for encoding an image. Specifically, FIG. 8 illustrates the image encoding flow for a color image. The method for encoding a color image may include some of the steps involved in encoding a monochrome image, as described above in reference to FIG. 1. In accordance with one or more embodiments, the method for encoding a color image may include additional steps as shown in FIG. 8. As will be described below, the method for encoding a color image may include applying edge enhancement for three axes, such as "luminance, R-G, Y-B," "Y, Cr, Cb," etc. Further, JND data for chroma direction (i.e. R-G, Y-B) can be calculated by the CIE deltaE*$_{2000}$ color difference formulae.

In step 800 of FIG. 8, a color image is received. The image data of the received image is converted from intensity (or density) into L*a*b* values in step 804. In accordance with one or more embodiments, a color management system (i.e. an ICC scheme) can be used for the conversion in step 804 of FIG. 8. Next, the maximum luminance value (in cd/m2) of the display or of the adjusted light source for observing a printed or a transparent image is defined in step 808. As discussed above, a Just-Noticeable Difference (JND) is a luminance difference of a given target under given viewing conditions that the average human observer can perceive. Further, a JND index is the input value to the Grayscale Standard Display Function (GSDF), such that one step in the JND index results in a luminance difference that is a JND. Accordingly, in step 812, JND indexes are calculated into L* values, based on the GSDF curve defined by the Digital Imaging and Communications in Medicine (DICOM) Standard and as shown in FIG. 2. Further, in step 814 of FIG. 8, based on the CIE deltaE*$_{2000}$ color difference formula, the color difference calculated by the formula can be used for the a* and b* axes.

In step 816 of FIG. 8, the difference of each pair of L* values of JND indexes is computed as is shown in FIG. 3. Further, the difference of each pair of a* values and b* values is checked in Step 818. When there is no corresponding value, the method for encoding a color image may include interpolating a corresponding value. Next, in step 820 of FIG. 8, an edge enhancement gain parameter is defined by dividing "JND difference" over "average JND difference" for three axes, wherein the JND index "673" corresponds to a luminance of 400 cd/m$^2$, which is the typical luminance of "white" on a display. In accordance with one or more embodiments, the edge enhancement gain parameter is shown in FIG. 4. In step 824 of FIG. 8, an edge enhancement is applied. As shown in FIG. 5, to primarily affect the higher spatial frequencies, a difference between a center pixel value and an average value of accumulated pixel values surrounding the center pixel in a kernel matrix is determined for three axes for edge enhancement. The kernel matrix is, for example, a 3×3 pixel matrix or a 5×5 pixel matrix and a bigger kernel is generally preferred in terms of spatial characteristics. However, other kernel matrices may be used without departing from the scope of the present disclosure.

In step 824 of FIG. 8, a "Contrast-EdgeEnhancement" characteristic curve is prepared. In accordance with one or more embodiments, FIG. 6 shows a "Contrast-EdgeEnhancement" curve in which the local contrast obtained from a kernel matrix is on the horizontal axis and SDgain on the vertical axis. FIG. 6 illustrates that edges that are steep, receive less or no edge enhancement. Further, it is understood, that in one embodiment, the local contrast is based on a kernel matrix in JND space. In other embodiments, the local contrast may be based on a uniform color space. In yet other embodiments, the local contrast may be based on another criteria without departing from the scope of the present invention. In step 824 of FIG. 8, equation (1) discussed above, is applied to the image. The local contrast may be calculated by standard deviation of a local area, for example the local kernel matrix shown in FIG. 5. The effect of equation (1) on the modified image is illustrated in FIG. 7. Little or no edge enhancement is applied to a large edge, while a small edge is enhanced depending on the characteristics of JND color difference. In Step 828, the image is outputted.

Figure 9:
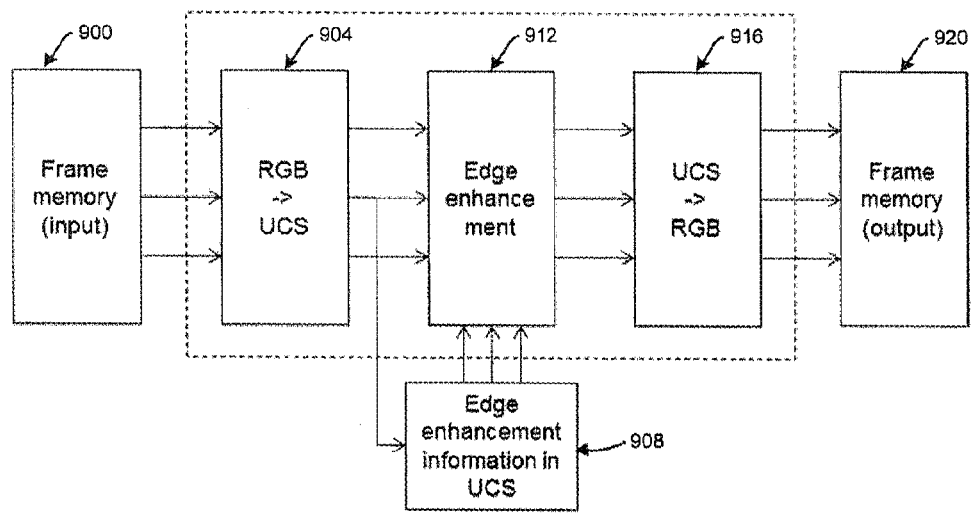
FIG. 9 shows a device for encoding an image in accordance with one or more embodiments of the invention.

In accordance with one or more embodiments, FIG. 9 shows a hardware implementation of a device for encoding an image. Specifically, FIG. 9 illustrates a device independent approach with 3D look-up table (LUT) and interpolation. Image data from a frame memory 900 (a first memory for receiving an image) is received by a RGB-to-UCS conversion block 904. Data from the RGB-to-UCS conversion block 904 is fed into an "edge enhancement information in UCS" block 908 and into an edge enhancement block 912. The output from the "edge enhancement information in UCS" block 908 is provided as input to the edge enhancement block 912. The output from the edge enhancement block 912 is provided as input to a UCS-to-RGB conversion block 916, which in turn provides image data to the frame memory 920 (a second memory for receiving the output image). In accordance with one or more embodiments, the edge enhancement block 912 may include an image adjustment section for adjusting the image based on a global uniform macro-type color space. The edge enhancement block 912 may further include an image modification section for modifying the image spatially based on a local uniform micro-type edge characteristic.

Figure 10:
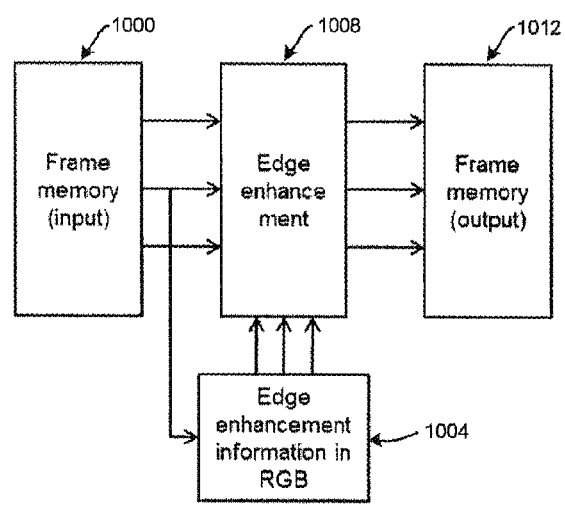
FIG. 10 shows a device for encoding an image in accordance with one or embodiments of the invention.

In accordance with one or more embodiments, FIG. 10 shows a further hardware implementation of a device for encoding an image. Specifically, FIG. 10 illustrates a device dependent approach with 3D look-up table (LUT) and interpolation. Image data from a frame memory 1000 (a first memory for receiving an image) is received by an "edge enhancement information in RGB" block 1004 and into an edge enhancement block 1008. The output from the "edge enhancement information in RGB" block 1004 is provided as input to the edge enhancement block 1008. The output from the edge enhancement block 1008 is provided as input to a frame memory 1012 (a second memory for receiving the output image). In accordance with one or more embodiments, the edge enhancement block 1008 may include an image adjustment section for adjusting the image based on a global uniform macro-type color space. The edge enhancement block 1008 may further include an image modification section for modifying the image spatially based on a local uniform micro-type edge characteristic.

In accordance with one or more embodiments, the coefficient $\alpha$ in equation (1) may be used to enhance or to blur edges. In the former case, $\alpha$ is larger than one and in the latter case, $\alpha$ is smaller than one.

In accordance with one or more embodiments, the GSDF may be changed depending on the intensity of the display or environment. In yet further embodiments, a brightness adjustment and edge enhancement characteristics are synchronized.

In accordance with one or more embodiments, Fourier transformation may be used before adjusting spatial frequency followed by inverse Fourier transformation. In yet other embodiments, Fast Fourier Transformation may be used.

In accordance with one or more embodiments, the CIE deltaE*$_{2000}$ color difference formulae may be used to estimate JND in the chroma directions. In yet other embodiments, Macadam's ellipse may be used to estimate JND in the chroma directions.

Figure 11:
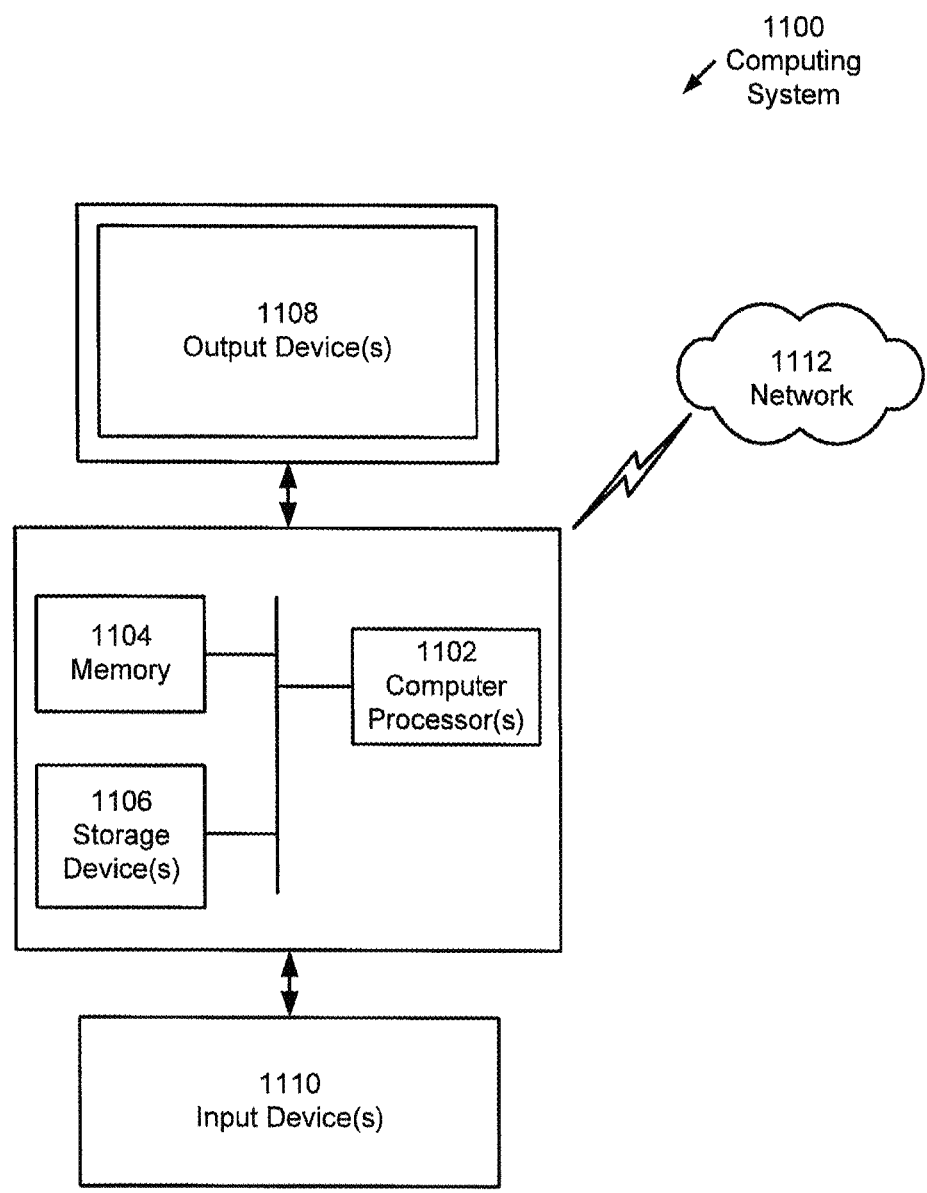
FIG. 11 shows a computer system in accordance with one or more embodiments of the invention.

Embodiments of the invention may be implemented on virtually any type of computer regardless of the platform being used. For example, as shown in FIG. 11, a computer system 1100 includes one or more processor(s) 1102 (such as a central processing unit (CPU), integrated circuit, etc.), associated memory 1104 (e.g., random access memory (RAM), cache memory, flash memory, etc.), a storage device 1106 (e.g., a hard disk, a solid state memory drive (SSD), an optical drive such as a compact disk drive or digital video disk (DVD) drive, a flash memory stick, etc.), and numerous other elements and functionalities typical of today's computers (not shown). The computer system 1100 may also include input means 1110, such as a keyboard, a mouse, or a microphone (not shown). Further, the computer system 1100 may include output means, such as a monitor 1108 (e.g., a liquid crystal display (LCD), a plasma display, or cathode ray tube (CRT) monitor). The computer system 1100 may be connected to a network 1112 (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system 1100 includes at least the minimal processing, input, and/or output means necessary to practice embodiments of the invention.

Further, in one or more embodiments of the invention, one or more elements of the aforementioned computer system 1100 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device (SSD), a tape, memory, or any other non-transitory tangible computer readable storage device.

In addition, one or more embodiments of the invention may be realized in an embedded computer system. Further, one or more embodiments of the invention may be realized in an erasable programmable read only memory (EPROM), programmable logic device (PLD) or in another hardware solutions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for encoding an image, comprising:
   receiving the image;
   adjusting the image based on a global uniform macro-type color space;
   modifying a portion of the image spatially based on a local uniform micro-type edge characteristic comprising a just-noticeable difference (JND) between a pixel of the portion and at least one neighboring pixel;
   converting, before the modifying of the portion of the image, the image from a first global uniform macro-type color space into a second global uniform macro-type color space;
   converting, after the modifying of the portion of the image, the image from the second global uniform macro-type color space into the first global uniform macro-type color space,
   wherein the local uniform micro-type edge characteristic is in the second global uniform macro-type color space; and
   outputting the image.

2. The method of claim 1, wherein the image comprises at least one of monochrome image and color image.

3. The method of claim 1, wherein the global uniform macro-type color space comprises at least one of sRGB, Adobe RGB, CIE L*a*b*, and CIE L*u*v*.

4. The method of claim 1, further comprising:
   enhancing an edge by a first predefined amount when the edge is smaller than a first predefined parameter; and
   reducing an edge by a second predefined amount when the edge is larger than a second predefined parameter.

5. The method of claim 4, wherein when a setting of a brightness level of a display device is changed, the first predefined parameter and the second predefined parameter are changed.

6. The method of claim 4, wherein when a setting of a brightness level of a display device is changed, the first predefined amount and the second predefined amount are changed.

7. A non-transitory computer readable medium (CRM) storing instructions for encoding an image, the instructions comprising functionality for:
   receiving the image;
   adjusting the image based on a global uniform macro-type color space;
   modifying a portion of the image spatially based on a local uniform micro-type edge characteristic comprising a just-noticeable difference (JND) between a pixel of the portion and at least one neighboring pixel;
   converting, before the modifying of the portion of the image, the image from a first global uniform macro-type color space into a second global uniform macro-type color space;
   converting, after the modifying of the portion of the image, the image from the second global uniform macro-type color space into the first global uniform macro-type color space,
   wherein the local uniform micro-type edge characteristic is in the second global uniform macro-type color space; and
   outputting the image.

8. The CRM of claim 7, wherein the image comprises at least one of monochrome image and color image.

9. The CRM of claim 7, wherein the global uniform macro-type color space comprises at least one of sRGB, Adobe RGB, CIE L*a*b*, and CIE L*u*v*.

10. The CRM of claim 7, wherein the instructions further comprise functionality for:
    enhancing an edge by a first predefined amount when the edge is smaller than a first predefined parameter; and
    reducing an edge by a second predefined amount when the edge is larger than a second predefined parameter.

11. The CRM of claim 10, wherein when a setting of a brightness level of a display device is changed, the first predefined parameter and the second predefined parameter are changed.

12. The CRM of claim 10, wherein when a setting of a brightness level of a display device is changed, the first predefined amount and the second predefined amount are changed.

13. A device for encoding an image, comprising:
    a first memory that receives an image;
    an image adjustment section that adjusts the image based on a global uniform macro-type color space;
    an image modification section that modifies a portion of the image spatially based on a local uniform micro-type edge characteristic comprising a just-noticeable difference (JND) between a pixel of the portion and at least one neighboring pixel; and
    a second memory that receives an output image,
    wherein the image adjustment section:
    before the modifying of the portion of the image, converts the image from a first global uniform macro-type color space into a second global uniform macro-type color space; and
    after the modifying of the portion of the image, converts the modified image from the second global uniform macro-type color space into the first global uniform macro-type color space,
    wherein the local uniform micro-type edge characteristic is in the second global uniform macro-type color space.

14. The device of claim 13, wherein the image comprises at least one of monochrome image and color image.

15. The device of claim 13, wherein the global uniform macro-type color space comprises at least one of sRGB, Adobe RGB, CIE L*a*b*, and CIE L*u*v*.

16. The device of claim 13, wherein the image modification section:
   enhances an edge by a first predefined amount when the edge is smaller than a first predefined parameter; and
   reduces an edge by a second predefined amount when the edge is larger than a second predefined parameter.

17. The device of claim 16, wherein when a setting of a brightness level of a display device is changed, the first predefined amount and the second predefined amount are changed.

* * * * *